US011979387B2

(12) United States Patent
Liu et al.

(10) Patent No.: US 11,979,387 B2
(45) Date of Patent: *May 7, 2024

(54) CLASSIFICATION OF ENCRYPTED INTERNET TRAFFIC

(71) Applicant: AT&T Intellectual Property I, L.P., Atlanta, GA (US)

(72) Inventors: Zhengye Liu, Pleasanton, CA (US); Donglin Hu, Dublin, CA (US); Jin Wang, Fremont, CA (US)

(73) Assignee: AT&T Intellectu al Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/068,505

(22) Filed: Dec. 19, 2022

(65) Prior Publication Data

US 2023/0127439 A1 Apr. 27, 2023

Related U.S. Application Data

(63) Continuation of application No. 16/533,190, filed on Aug. 6, 2019, now Pat. No. 11,533,299.

(51) Int. Cl.
*H04L 9/40* (2022.01)
*G06N 3/08* (2023.01)
(Continued)

(52) U.S. Cl.
CPC ........... *H04L 63/0428* (2013.01); *G06N 3/08* (2013.01); *H04L 47/2441* (2013.01); *H04L 47/2483* (2013.01)

(58) Field of Classification Search
CPC ............. H04L 47/2441; H04L 47/2483; H04L 63/0428; G06N 3/08
See application file for complete search history.

(56) References Cited

U.S. PATENT DOCUMENTS 10,567,284 B1 2/2020 Piriyath et al.
2017/0118314 A1* 4/2017 Lin ..................... H04L 63/0428
(Continued)

OTHER PUBLICATIONS

T. Shapira and Y. Shavitt, "FlowPic: Encrypted Internet Traffic Classification is as Easy as Image Recognition," IEEE INFOCOM 2019—IEEE Conference on Computer Communications Workshops (INFOCOM WKSHPS), 2019, pp. 680-687, doi: 10.1109/INFCOMW.2019.8845315. (Year: 2019).

*Primary Examiner* — Chau Le (57) ABSTRACT

A method includes obtaining a first plurality of encrypted traffic flows traversing a communication network, performing a first classification, wherein a result of the first classification identifies a traffic type associated with each encrypted traffic flow of the first plurality of encrypted traffic flows, and wherein the first classification is based on a traffic pattern of the each encrypted traffic flow, performing a second classification, wherein a result of the second classification identifies a traffic type associated with each server name indication from which the first plurality of encrypted traffic flows is associated, and wherein the second classification is based on the result of the first classification, and performing a third classification identifying a traffic type associated with each encrypted traffic flow of the first plurality of encrypted traffic flows, wherein the third classification is based on a combination of the results of the first classification and the second classification.

20 Claims, 3 Drawing Sheets

(51) Int. Cl.
*H04L 47/2441* (2022.01)
*H04L 47/2483* (2022.01)

(56) References Cited

U.S. PATENT DOCUMENTS

| | | |
|---|---|---|
| 2019/0037270 A1 | 1/2019 | Arpirez Vega et al. |
| 2019/0044835 A1* | 2/2019 | Kutch ................. H04L 47/2441 |
| 2019/0394308 A1 | 12/2019 | Balasubramanian et al. |
| 2020/0110853 A1* | 4/2020 | Tooley ................ H04L 63/1408 |

* cited by examiner

CLASSIFICATION OF ENCRYPTED INTERNET TRAFFIC

This application is a continuation of U.S. patent application Ser. No. 16/533,190, filed on Aug. 6, 2019, now U.S. Pat. No. 11,533,299, which is herein incorporated by reference in its entirety.

The present disclosure relates generally to Internet traffic classification, and relates more particularly to devices, non-transitory computer-readable media, and methods for classification of encrypted Internet traffic.

BACKGROUND

Internet traffic classification categorizes Internet traffic into a plurality of classes. For instance, different classes may be defined for Internet traffic associated with online gaming, video streaming, email, voice calling (e.g., Voice over Internet Protocol or VoIP), and the like. Each class of traffic may require a different Quality of Experience (QoE). Thus, higher priority classes of traffic demanding greater QoE may be allocated more network resources (e.g., more bandwidth) than other classes. As such, being able to accurately classify Internet traffic is vital to helping Internet service providers optimize their networks to achieve optimal QoE with limited network resources.

SUMMARY

In one example, the present disclosure describes a device, computer-readable medium, and method for classifying encrypted Internet traffic flows. For instance, in one example, a method performed by a processing system in a communication network includes obtaining a first plurality of encrypted traffic flows traversing the communication network, performing a first classification, wherein a result of the first classification identifies a traffic type associated with each encrypted traffic flow of the first plurality of encrypted traffic flows, and wherein the first classification is based on a traffic pattern of the each encrypted traffic flow, performing a second classification, wherein a result of the second classification identifies a traffic type associated with each server name indication from which the first plurality of encrypted traffic flows is associated, and wherein the second classification is based on results of the first classification, and performing a third classification identifying a traffic type associated with each encrypted traffic flow of the first plurality of encrypted traffic flows, wherein the third classification is based on a combination of the result of the first classification and the result of the second classification.

In another example, a device includes a processing system in a communication network and a computer-readable medium storing instructions which, when executed by the processing system, cause the processing system to perform operations. The operations include obtaining a first plurality of encrypted traffic flows traversing the communication network, performing a first classification, wherein a result of the first classification identifies a traffic type associated with each encrypted traffic flow of the first plurality of encrypted traffic flows, and wherein the first classification is based on a traffic pattern of the each encrypted traffic flow, performing a second classification, wherein a result of the second classification identifies a traffic type associated with each server name indication from which the first plurality of encrypted traffic flows is associated, and wherein the second classification is based on results of the first classification, and performing a third classification identifying a traffic type associated with each encrypted traffic flow of the first plurality of encrypted traffic flows, wherein the third classification is based on a combination of the result of the first classification and the result of the second classification.

In another example, a computer-readable medium stores instructions which, when executed by a processing system of a communication network, cause the processing system to perform operations. The operations include obtaining a first plurality of encrypted traffic flows traversing the communication network, performing a first classification, wherein a result of the first classification identifies a traffic type associated with each encrypted traffic flow of the first plurality of encrypted traffic flows, and wherein the first classification is based on a traffic pattern of the each encrypted traffic flow, performing a second classification, wherein a result of the second classification identifies a traffic type associated with each server name indication from which the first plurality of encrypted traffic flows is associated, and wherein the second classification is based on results of the first classification, and performing a third classification identifying a traffic type associated with each encrypted traffic flow of the first plurality of encrypted traffic flows, wherein the third classification is based on a combination of the result of the first classification and the result of the second classification.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure classifies encrypted Internet traffic. As discussed above, different classes may be defined for Internet traffic associated with online gaming, video streaming, email, voice calling (e.g., Voice over Internet Protocol or VoIP), and the like. Each class of traffic may require a different Quality of Experience (QoE). Thus, higher priority classes of traffic demanding greater QoE may be allocated more network resources (e.g., more bandwidth) than other classes for which the required QoE is lower. As such, being able to accurately classify Internet traffic is vital to helping Internet service providers optimize their networks to achieve optimal QoE with limited network resources. This is especially true for video and non-video traffic, as video traffic typically consumes a great deal more resources than non-video traffic.

However, as encrypted communication protocols such as hypertext transfer protocol secure (HTTPS) and QUIC (also referred to herein as "quic") become more widely used, it becomes more difficult to accurately classify Internet traffic. For instance, traditional traffic classification techniques such as deep packet inspection (DPI) are less effective, since the data that is typically inspected to determine traffic type (e.g., network signatures, HTTP headers, etc.) is no longer visible. Other techniques which have been proposed specifically for classifying encrypted traffic analyze traffic patterns (e.g., numbers of bytes transmitted in each time slot) rather than packet headers. However, these techniques are typically applied to individual traffic flows, which can impact classification accuracy. Specifically, traffic patterns are affected not only by traffic type (which is determined at the application layer), but also by underlying network conditions (which are determined by the physical and media access control layers). Thus, when the lower network layers (i.e., physical and/or media access control) have a larger impact on the traffic patterns, this may diminish the accuracy of classifications made based on the traffic patterns.

Examples of the present disclosure provide a hybrid approach to classifying encrypted Internet traffic, in which both traffic patterns and traffic signatures (e.g., server name indications, or SNIs) are analyzed to determine class. In one example, packet flows traversing a network may be replicated, and the replica or "mirrored" versions of the original packets may be subsequently analyzed by one or more servers. This analysis may include using machine learning models to perform an initial classification of individual traffic flows. Subsequently, the results of the initial classification may be used to classify the SNIs to which the individual traffic flows belong. Then, providing that the traffic types of the SNIs are classified, the classifications of the individual traffic flows can be refined by using the SNI traffic types as prior probability distributions (or simply "priors"). Since SNIs are always available for encrypted traffic flows both in HTTPS and QUIC, this approach significantly minimizes the influence of underlying network conditions on the classification of the traffic flows.

Within the context of the present disclosure, a "traffic pattern" is understood to refer to a vector of a number of bytes transmitted in specific time slots (e.g., every x seconds) for a traffic flow. For instance, a traffic pattern for an example traffic flow may be represented as [1000, 500, 200, 400, 300], where "1000" indicates that one thousand bytes were transmitted during a first time slot for the traffic flow, five hundred bytes were transmitted during a second time slot, two hundred bytes were transmitted during a third time slot, and so on.

Figure 1:
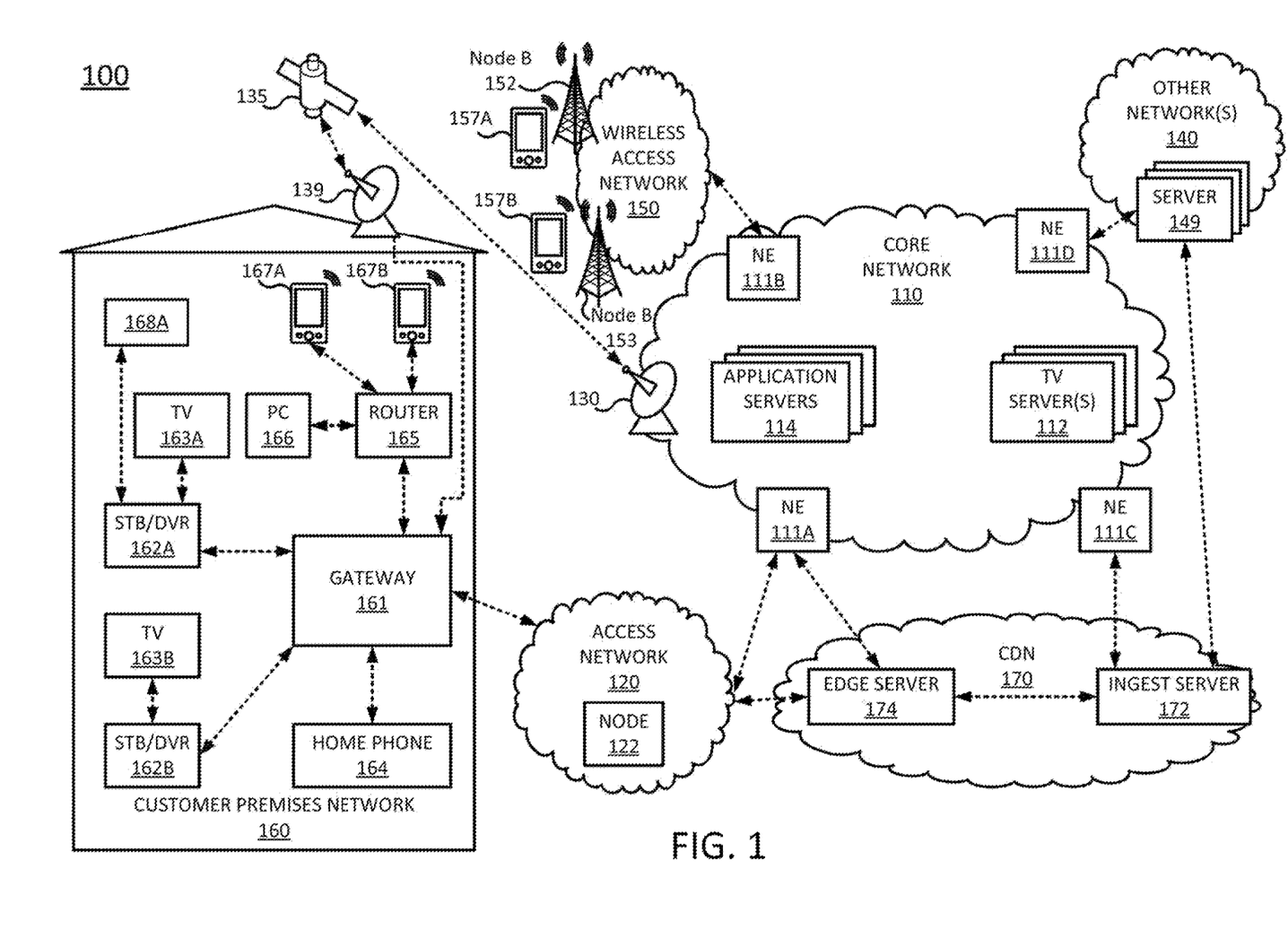
FIG. 1 illustrates an example network related to the present disclosure.

To better understand the present disclosure, FIG. 1 illustrates an example system 100 (e.g., comprising one or more networks), related to the present disclosure. As shown in FIG. 1, the system 100 connects mobile devices 157A, 157B, 167A and 167B, and home network devices such as home gateway 161, set-top boxes (STBs) 162A and 162B, television (TV) 163A and TV 163B, phone 164, router 165, personal computer (PC) 166, and so forth, with one another and with various other devices via a telecommunication network 110, a wireless access network 150 (e.g., a cellular network), an access network 120, other networks 140, content distribution network (CDN) 170, and/or the Internet in general. For instance, connections between telecommunication network 110, access network 120, customer premises network 160 (e.g., a home network, an enterprise network, etc.), CDN 170, wireless access network 150 and other networks 140 may comprise the Internet in general, internal links under the control of single telecommunication service provider network, links between peer networks, and so forth.

In one example, wireless access network 150 may comprise a radio access network implementing such technologies as: Global System for Mobile Communication (GSM), e.g., a Base Station Subsystem (BSS), or IS-95, a Universal Mobile Telecommunications System (UMTS) network employing Wideband Code Division Multiple Access (WCDMA), or a CDMA3000 network, among others. In other words, wireless access network 150 may comprise an access network in accordance with any "second generation" (2G), "third generation" (3G), "fourth generation" (4G), Long Term Evolution (LTE), "fifth generation" (5G) or any other yet to be developed future wireless/cellular network technology. While the present disclosure is not limited to any particular type of wireless access network, in the illustrative example, wireless access network 150 is shown as a UMTS terrestrial radio access network (UTRAN) subsystem. Thus, elements 152 and 153 may each comprise a Node B or evolved Node B (eNodeB). In one example, wireless access network 150 may be controlled and/or operated by a same entity as telecommunication network 110.

In one example, each of the mobile devices 157A, 157B, 167A, and 167B may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, and the like. In one example, any one or more of mobile devices 157A, 157B, 167A, and 167B may have both cellular and non-cellular access capabilities and may further have wired communication and networking capabilities.

As illustrated in FIG. 1, system 100 includes a telecommunication core network 110. In one example, telecommunication core network 110 may combine core network components of a cellular network with components of a triple play service network; where triple play services include telephone services, Internet services and television services to subscribers. For example, telecommunication core network 110 may functionally comprise a fixed mobile convergence (FMC) network, e.g., an IP Multimedia Subsystem (IMS) network. In addition, telecommunication core network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Telecommunication core network 110 may also further comprise a broadcast television network, e.g., a traditional cable provider network or an Internet Protocol Television (IPTV) network, as well as an Internet Service Provider (ISP) network. The network elements (NEs) 111A-111D (hereinafter individually referred to as a "network element 111" or collectively referred to as "network elements 111") may serve as gateway servers or edge routers to interconnect the telecommunication core network 110 with other networks 140, wireless access network 150, access network 120, and so forth. As shown in FIG. 1, telecommunication core network 110 may also include a plurality of television (TV) servers 112, and a plurality of application servers 114.

In accordance with the present disclosure, one or more of the network elements 111 may also function as a classifier for classifying data traffic that traverses the system 100. In this case, the network element 111 may observe traffic patterns and traffic signatures (e.g., SNIs) for all traffic flows and may classify the traffic flows according to the examples described herein. For instance, the network element 111 may use machine learning models to perform an initial classification of individual traffic flows. Subsequently, the results of the initial classification may be used to classify the SNIs to which the individual traffic flows belong. Then, the classifications of the individual traffic flows can be refined by using the SNI traffic types as priors.

The network element 111 may further perform optimizations to the system 100 based on the resulting classifications. For instance, the network element may allocate network resources among a plurality of traffic flows based on the classifications of those traffic flows. In one example, a network element 111 which functions as a classifier may comprise all or a portion of a computing device or system, such as computing system 300, and/or processing system 302 as described in connection with FIG. 3 below, specifically configured to perform various steps, functions, and/or operations for classifying encrypted Internet traffic, as described herein.

Figure 3:
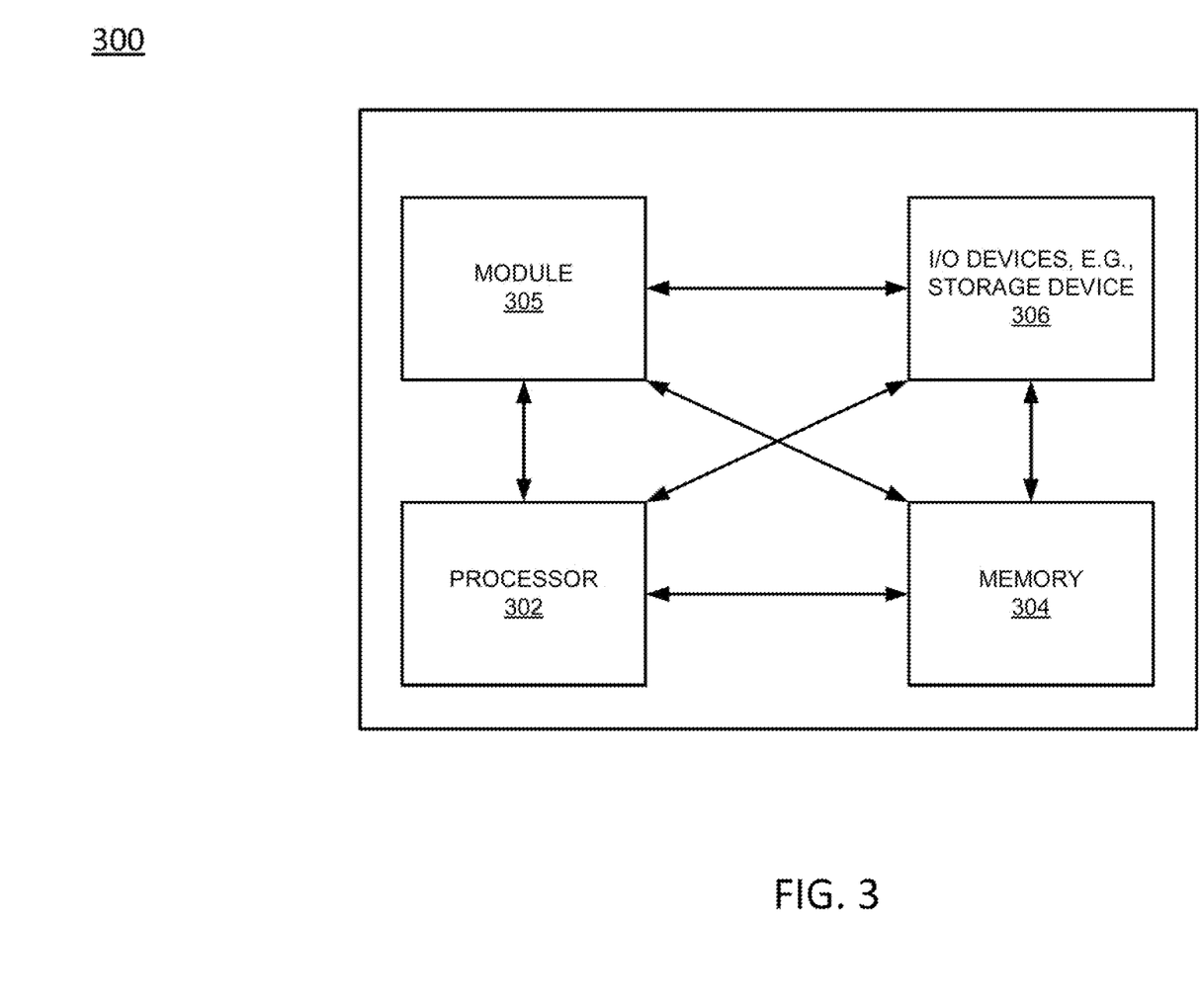
FIG. 3 depicts a high-level block diagram of a computing device specifically programmed to perform the functions described herein.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure. For ease of illustration, various additional elements of telecommunication core network 110 are omitted from FIG. 1.

With respect to television service provider functions, telecommunication core network 110 may include one or more television servers 112 for the delivery of television content, e.g., a broadcast server, a cable head-end, and so forth. For example, telecommunication core network 110 may comprise a video super hub office, a video hub office and/or a service office/central office. In this regard, television servers 112 may include content server(s) to store scheduled television broadcast content for a number of television channels, video-on-demand (VoD) programming, local programming content, and so forth. Alternatively, or in addition, content providers may stream various contents to the telecommunication core network 110 for distribution to various subscribers, e.g., for live content, such as news programming, sporting events, and the like. Television servers 112 may also include advertising server(s) to store a number of advertisements that can be selected for presentation to viewers, e.g., in the customer premises network 160 and at other downstream viewing locations. For example, advertisers may upload various advertising content to the telecommunication core network 110 to be distributed to various viewers. Television servers 112 may also include interactive TV/video-on-demand (VoD) server(s) and/or network-based digital video recorder (DVR) servers, as described in greater detail below.

In one example, the access network 120 may comprise a Digital Subscriber Line (DSL) network, a broadband cable access network, a Local Area Network (LAN), a cellular or wireless access network, a 3$^{rd}$ party network, and the like. For example, the operator of telecommunication core network 110 may provide a cable television service, an IPTV service, or any other types of television service to subscribers via access network 120. In this regard, access network 120 may include a node 122, e.g., a mini-fiber node (MFN), a video-ready access device (VRAD) or the like. However, in another example, node 122 may be omitted, e.g., for fiber-to-the-premises (FTTP) installations. Access network 120 may also transmit and receive communications between customer premises network 160 and telecommunication core network 110 relating to voice telephone calls, communications with web servers via other networks 140, content distribution network (CDN) 170 and/or the Internet in general, and so forth. In another example, access network 120 may be operated by a different entity from telecommunication core network 110, e.g., an Internet service provider (ISP) network.

Alternatively, or in addition, the system 100 may provide television services to customer premises network 160 via satellite broadcast. For instance, ground station 130 may receive television content from television servers 112 for uplink transmission to satellite 135. Accordingly, satellite 135 may receive television content from ground station 130 and may broadcast the television content to satellite receiver 139, e.g., a satellite link terrestrial antenna (including satellite dishes and antennas for downlink communications, or for both downlink and uplink communications), as well as to satellite receivers of other subscribers within a coverage area of satellite 135. In one example, satellite 135 may be controlled and/or operated by a same network service provider as the telecommunication network 110. In another example, satellite 135 may be controlled and/or operated by a different entity and may carry television broadcast signals on behalf of the telecommunication core network 110.

As illustrated in FIG. 1, telecommunication core network 110 may include various application servers 114. For instance, application servers 114 may be implemented to provide certain functions or features, e.g., a Serving-Call Session Control Function (S-CSCF), a Proxy-Call Session Control Function (P-CSCF), or an Interrogating-Call Session Control Function (I-CSCF), one or more billing servers for billing one or more services, including cellular data and telephony services, wire-line phone services, Internet access services, and television services. Application servers 114 may also include a Home Subscriber Server/Home Location Register (HSS/HLR) for tracking cellular subscriber device location and other functions. An HSS refers to a network element residing in the control plane of an IMS network that acts as a central repository of all customer specific authorizations, service profiles, preferences, etc. Application servers 114 may also include an IMS media server (MS) for handling and terminating media streams to provide services such as announcements, bridges, and Interactive Voice Response (IVR) messages for VoIP and cellular service applications. The MS may also interact with customers for media session management. In addition, application servers 114 may also include a presence server, e.g., for detecting a presence of a user. For example, the presence server may determine the physical location of a user or whether the user is "present" for the purpose of a subscribed service, e.g., online for a chatting service and the like. In one example, application servers 114 may include data storage servers to receive and store manifest files regarding adaptive bitrate streaming videos maintained within TV servers 112 and/or available to subscribers of telecommunication core network 110 and stored in server(s) 149 in other networks 140. It should be noted that the foregoing are only several examples of the types of relevant application servers 114 that may be included in telecommunication network 110 for storing information relevant to providing various services to subscribers.

In one example, customer premises network 160 may include a gateway 161, which receives data/communications associated with different types of media, e.g., television, phone, and Internet, and separates these communications for the appropriate devices. The data/communications may be received via access network 120 and/or via satellite receiver 139, for instance. In one example, television data is forwarded to set-top boxes (STBs)/digital video recorders (DVRs) 162A and 162B to be decoded, recorded, and/or forwarded to television (TV) 163A and TV 163B for presentation. Similarly, telephone data is sent to and received from phone 164; Internet communications are sent to and received from router 165, which may be capable of both wired and/or wireless communication. In turn, router 165 receives data from and sends data to the appropriate devices, e.g., personal computer (PC) 166, mobile devices 167A and 167B, and so forth. In one example, router 165 may further communicate with TV (broadly a display) 163A and/or 163B, e.g., where one or both of the televisions is a smart TV. In one example, router 165 may comprise a wired Ethernet router and/or an Institute for Electrical and Electronics Engineers (IEEE) 802.11 (Wi-Fi) router, and may communicate with respective devices in customer premises network 160 via wired and/or wireless connections.

System 100 may also include a content distribution network (CDN) 170. In one example, CDN 170 may be operated by a different entity from telecommunication network 110. In another example, CDN 170 may be operated by a same entity as telecommunication network 110, e.g., a telecommunication service provider. In one example, the CDN 170 may comprise a collection of cache servers distributed across a large geographical area and organized in a tier structure. The first tier may comprise a group of servers that accesses content web servers (e.g., origin servers) to pull content into the CDN 170, referred to as an ingestion servers, e.g., ingest server 172. The content may include videos, content of various webpages, electronic documents, video games, etc. A last tier may comprise cache servers which deliver content to end user, referred to as edge caches, or edge servers, e.g., edge server 174. For ease of illustration, a single ingest server 172 and a single edge server 174 are shown in FIG. 1. In between the ingest server 172 and edge server 174, there may be several layers of servers (omitted from the illustrations), referred to as the middle tier. In one example, the edge server 174 may be multi-tenant, serving multiple content providers, such as telecommunication network 110, content providers associated with server(s) 149 in other network(s) 140, and so forth. In one example, edge server 174 may comprise an adaptive bitrate streaming video server.

It should be noted that the system 100 may be implemented in a different form than that which is illustrated in FIG. 1, or may be expanded by including additional endpoint devices, access networks, network elements, application servers, etc. without altering the scope of the present disclosure. For example, telecommunication core network 110 is not limited to an IMS network. Wireless access network 150 is not limited to a UMTS/UTRAN configuration. Similarly, the present disclosure is not limited to an IP/MPLS network for VoIP telephony services, or any particular type of broadcast television network for providing television services, and so forth. Thus, these and other modification are all contemplated within the scope of the present disclosure.

Figure 2:
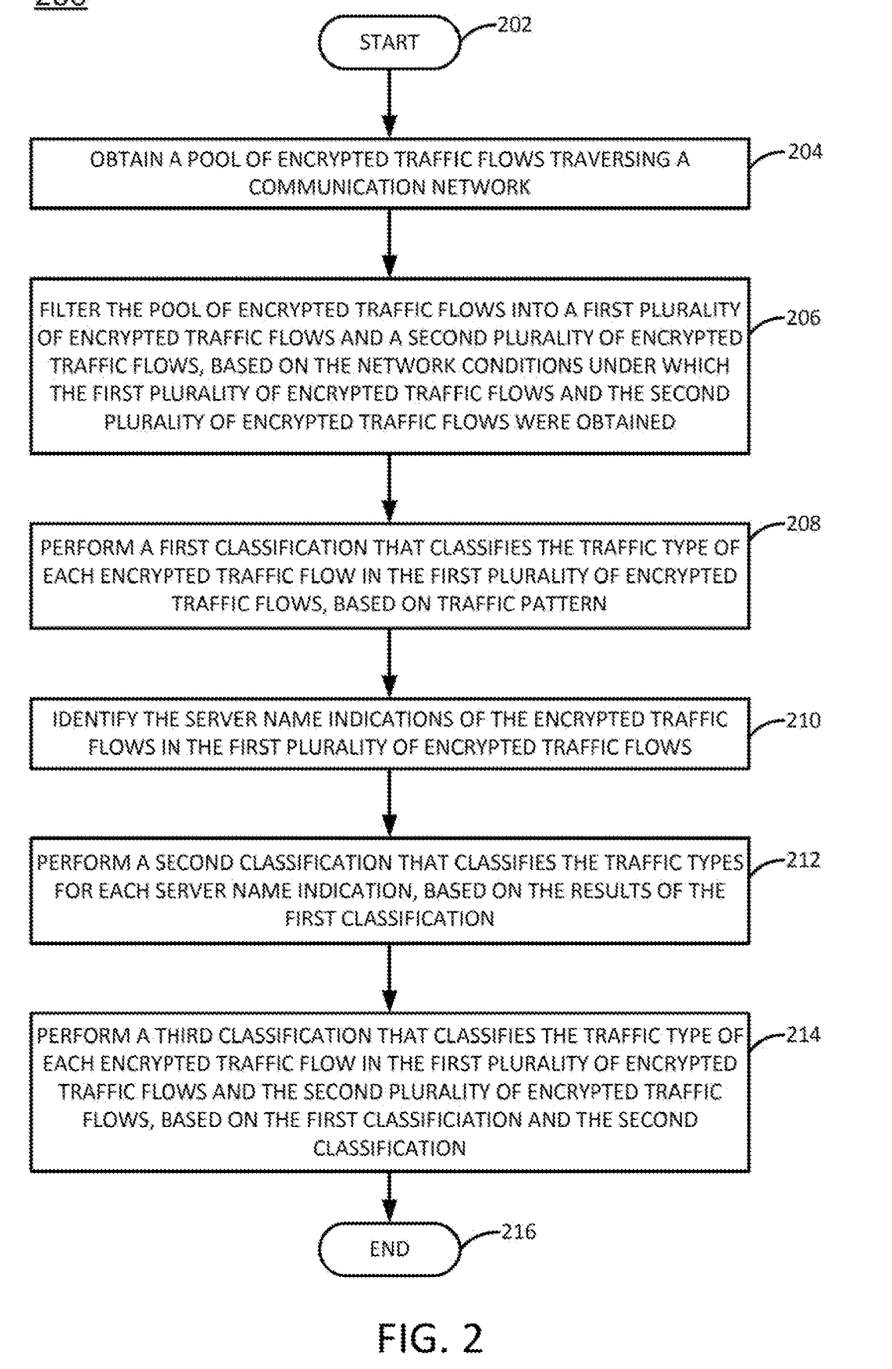
FIG. 2 illustrates a flowchart of a first example method for classifying encrypted Internet traffic in accordance with the present disclosure.

To further aid in understanding the present disclosure, FIG. 2 illustrates a flowchart of a first example method 200 for classifying encrypted Internet traffic. In one example, the method 200 may be performed by a network element (e.g., a gateway or proxy) in a core network, such as any one of the network elements 111 illustrated in FIG. 1. However, in other examples, the method 200 may be performed by another device, such as the processor 302 of the system 300 illustrated in FIG. 3. For the sake of example, the method 200 is described below as being performed by a processing system in a telecommunications network.

The method 200 begins in step 202. In step 204, the processing system may obtain a pool or plurality of encrypted traffic flows (e.g., HTTPS and/or QUIC flows) traversing the network. A "flow" within this context refers to a series of data packets exchanged between two network endpoints, e.g., a server hosting a video and a client consuming the video. The series of data packets may be replicas of the original data packets that have been mirrored for the purposes of classification. The plurality of encrypted traffic flows may include at least a first encrypted traffic flow and a second encrypted traffic flow.

In step 206, the processing system may filter the pool of encrypted traffic flows into a first plurality of encrypted traffic flows and a second plurality of encrypted traffic flows, based on the network conditions under which the encrypted traffic flows were obtained. In one example the first plurality of encrypted traffic flows may comprise encrypted traffic flows that are obtained under network conditions that at least meet a predefined threshold, while the second plurality of encrypted traffic flows may comprise encrypted traffic flows that are obtained under network conditions that fail to meet the threshold metric.

The threshold metric may measure and aggregate various parameters that describe the network conditions, such as upstream and/or downstream bandwidth, latency, throughput, jitter, error rate, and the like. For instance, each parameter to be considered may be measured and aggregated in a weighted sum, where different weights may be applied to different parameters based on the parameters' relative importances (e.g., if latency is considered more important than jitter, then latency may be multiplied by a larger weight in the weighted sum than jitter). If the value of the weighted sum is at least equal to the predefined threshold metric, then the network conditions may be considered "good enough" for an encrypted traffic flow obtained under the network conditions to be considered when performing certain further steps of the method 200, discussed in further detail below. Conversely, if the value of the weighted sum is below the threshold metric, then the network conditions may be considered "not good enough" for an encrypted traffic flow obtained under the network conditions to be considered when performing certain further steps of the method 200, discussed in further detail below.

Thus, if the network conditions under which an encrypted traffic flow were obtained are not good enough (e.g., below the threshold metric), then the processing system may exclude the encrypted traffic flow from consideration when performing certain further steps of the method 200. By excluding encrypted traffic flows for which the network conditions are below the threshold metric (or for which the network conditions are "not good enough"), the influence of the network conditions on the traffic patterns of the encrypted traffic flows can be minimized, so that the observed traffic patterns are more strongly associated to the application types of the encrypted traffic flows.

In step 208, the processing system may perform a first classification that classifies the traffic type of each encrypted traffic flow in the first plurality of encrypted traffic flows based on traffic pattern. In one example, traffic pattern-based classification in accordance with step 208 uses a machine learning model. In one example, the machine learning model is a model that has been trained on test data (e.g., sample traffic flows) using a supervised learning approach. The test data may be obtained, for example, from third party media stores (e.g., video sharing web sites, subscription-based video streaming sites, etc.). In one example, the machine learning model is a deep learning model, such as a deep neural network, a recurrent neural network, a convolutional neural network, a deep belief network, or the like. The machine learning model may classify each encrypted traffic flow as online gaming data, video streaming data, email data, voice calling data, or the like.

In step 210, the processing system may identify the SNIs of the encrypted traffic flows in the first plurality of encrypted traffic flows. SNI is always available when using certain encrypted protocols including HTTPS and QUIC (which are presently the two most widely used protocols for exchanging encrypted Internet traffic). One example of an SNI may be, for instance, "scontent-lax3-1.xx.fbcdn.net." An Internet content provider, such as a social media site or a content sharing site, may have multiple SNIs, where each individual SNI may serve a different, specific type of traffic. In other examples, however, a single SNI may serve multiple different types of traffic. Examples of the present disclosure utilize SNI as a network signature.

In step 212, the processing system may perform a second classification that classifies the traffic types of the SNIs, based on the classification results obtained in step 208. For instance, in one example, a first subset of the first plurality of encrypted traffic flows may all share a first SNI (i.e., the same SNI). Further, within the first subset, a first traffic type classification (obtained from step 210) may be more common than other traffic type classifications. In this case, the first traffic type may be assigned to the first SNI. There are a plurality of ways in which the first traffic type may be selected for assignment to the first SNI, including majority voting, Bayesian classification, and others. Thus, the output of step 212 indicates the traffic type to which each of the SNIs belongs (e.g., SNI A belongs to video data, SNI B belongs to online gaming data, SNI C belongs to voice calling data, etc.). In one example, the output of step 212 may further associate a probability with each assignment of traffic type to SNI (e.g., e.g., SNI A belongs to video data with x percent confidence, SNI B belongs to online gaming data with y percent confidence, SNI C belongs to voice calling data with z percent confidence, etc.).

In step 214, the processing system may perform a third classification that re-classifies the traffic types of all of the encrypted traffic flows in the pool of traffic flows obtained in step 204 (i.e., including the first plurality of the encrypted traffic flows and the second plurality of the encrypted traffic flows), based on a combination of the traffic patterns (as classified in the results of step 210) and SNIs (as classified in the results of step 212) of the encrypted traffic flows. In one example, the processing system may evaluate each encrypted traffic flow in the pool of encrypted traffic flows individually in step 214. Classification in accordance with step 214 may involve using a Bayesian classifier, with the classified SNI of the encrypted traffic flow (and the classified SNI's probability, if available) as a prior (i.e., a probability distribution expressing a belief about the traffic type of the encrypted traffic flow). In this case, if an SNI is strongly believed to be associated with a specific traffic type based on steps 210-212, then no matter how the network conditions may affect the traffic pattern of an individual encrypted traffic flow, it is likely that the individual traffic flow will be classified with the same traffic type as the individual traffic flow's SNI. Thus, the influence of the network conditions on the traffic patterns of individual encrypted traffic flows is minimized, for the purposes of classifying traffic types.

The method 200 may end in step 216.

Thus, the method 200 provides a hybrid approach to classifying Internet traffic, in which both traffic patterns and traffic signatures (e.g., SNIs) are analyzed to determine traffic type for a traffic flow. This approach allows traffic types to be identified even for traffic flows whose packets are encrypted, allowing in turn for improved network optimization and customer QoE. Moreover, since SNIs are always available for traffic flows transmitted in accordance with the most widely used encrypted protocols (e.g., HTTPS and QUIC), this approach significantly minimizes the influence of underlying network conditions on the classification of the traffic flows and therefore improves classification accuracy.

It should be noted that although the method 200 is discussed within the context of classifying encrypted Internet traffic, the techniques described above could be extended to classify unencrypted Internet traffic as well. For instance, rather than using SNI as the network signature for a traffic flow (e.g., as discussed in connection with step 212 above), the HTTP uniform resource locator (URL) or partial HTTP URL may be used as the network signature when classifying unencrypted network traffic. In this case, the traffic type to which each of the URLs (or partial URLs) belongs could be determined and used to classify traffic flows associated with those URLs.

Although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the examples of the present disclosure.

FIG. 3 depicts a high-level block diagram of a computing device specifically programmed to perform the functions described herein. For example, any one or more components or devices illustrated in FIG. 1 or described in connection with the method 200 may be implemented as the system 300. For instance, a network element (such as might be used to perform the method 200) could be implemented as illustrated in FIG. 3.

As depicted in FIG. 3, the system 300 comprises a hardware processor element 302, a memory 304, a module 305 for classifying the traffic types of encrypted Internet traffic flows, and various input/output (I/O) devices 306.

The hardware processor 302 may comprise, for example, a microprocessor, a central processing unit (CPU), or the like. The memory 304 may comprise, for example, random access memory (RAM), read only memory (ROM), a disk drive, an optical drive, a magnetic drive, and/or a Universal Serial Bus (USB) drive. The module 305 for classifying the traffic types of encrypted Internet traffic flows may include circuitry and/or logic for performing special purpose functions relating to Internet traffic classification. The input/output devices 306 may include, for example, a camera, a video camera, storage devices (including but not limited to, a tape drive, a floppy drive, a hard disk drive or a compact disk drive), a receiver, a transmitter, a speaker, a microphone, a transducer, a display, a speech synthesizer, a haptic device, an output port, or a user input device (such as a keyboard, a keypad, a mouse, and the like).

Although only one processor element is shown, it should be noted that the general-purpose computer may employ a plurality of processor elements. Furthermore, although only one general-purpose computer is shown in the Figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for classifying the traffic types of encrypted Internet traffic flows (e.g., a software program comprising computer-executable instructions) can be loaded into memory 304 and executed by hardware processor element 302 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for classifying the traffic types of encrypted Internet traffic flows (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method comprising:
    obtaining, by a processing system in a communication network, a first plurality of encrypted traffic flows traversing the communication network;
    performing, by the processing system, a first classification, wherein a result of the first classification identifies a traffic type of a plurality of traffic types associated with each encrypted traffic flow of the first plurality of encrypted traffic flows, and wherein the first classification is based on a traffic pattern of the each encrypted traffic flow;
    performing, by the processing system, a second classification, wherein a result of the second classification assigns, for each server name indication of a plurality of server name indications with which the first plurality of encrypted traffic flows is associated, one traffic type of the plurality of traffic types, and wherein the one traffic type comprises a predominant traffic type of the plurality of traffic types that is associated, based on the first classification, with a subset of the first plurality of encrypted traffic flows that share the each server name indication; and
    performing, by the processing system, a third classification identifying a traffic type associated with each encrypted traffic flow of the first plurality of encrypted traffic flows, wherein the third classification is based on a combination of the result of the first classification and the result of the second classification.

2. The method of claim 1, further comprising:
    filtering, by the processing system, a pool of encrypted traffic flows traversing the communication network into the first plurality of encrypted traffic flows and a second plurality of encrypted traffic flows, wherein the first plurality of encrypted traffic flows comprises encrypted traffic flows for which a metric measuring one or more conditions of the communication network at least meets a predefined threshold, and wherein the second plurality of encrypted traffic flows comprises encrypted traffic flows for which the metric falls below the predefined threshold.

3. The method of claim 2, wherein the third classification additionally identifies a traffic type associated with each encrypted traffic flow of the second plurality of encrypted traffic flows.

4. The method of claim 1, wherein the first plurality of encrypted traffic flows comprises a plurality of hypertext transfer protocol secure flows.

5. The method of claim 1, wherein the first plurality of encrypted traffic flows comprises a plurality of quic flows.

6. The method of claim 1, wherein the first classification is performed using a machine learning model that is trained on third party media stores using a supervised learning approach.

7. The method of claim 1, wherein the second classification further includes identifying a confidence in the one traffic type associated with the each server name indication.

8. The method of claim 1, wherein the third classification is performed using a bayesian classifier.

9. The method of claim 8, wherein the bayesian classifier uses the result of the second classification as a prior.

10. The method of claim 1, wherein the traffic pattern comprises a number of bytes transmitted within each time slot of a plurality of time slots for the each encrypted traffic flow.

11. The method of claim 1, wherein the processing system is part of a network element deployed in the communication network.

12. The method of claim 1, further comprising:
performing, by the processing system, an optimization to the communication network in response to the third classification, wherein the optimization optimizes a quality of experience associated with a first traffic type of the plurality of traffic types that is associated with a first subset of the first plurality of encrypted traffic flows.

13. A device comprising:
a processing system in a communication network; and
a computer-readable medium storing instructions which, when executed by the processing system, cause the processing system to perform operations, the operations comprising:
  obtaining a first plurality of encrypted traffic flows traversing the communication network;
  performing a first classification, wherein a result of the first classification identifies a traffic type of a plurality of traffic types associated with each encrypted traffic flow of the first plurality of encrypted traffic flows, and wherein the first classification is based on a traffic pattern of the each encrypted traffic flow;
  performing a second classification, wherein a result of the second classification assigns, for each server name indication of a plurality of server name indications with which the first plurality of encrypted traffic flows is associated, one traffic type of the plurality of traffic types, and wherein the one traffic type comprises a predominant traffic type of the plurality of traffic types that is associated, based on the first classification, with a subset of the first plurality of encrypted traffic flows that share the each server name indication; and
  performing a third classification identifying a traffic type associated with each encrypted traffic flow of the first plurality of encrypted traffic flows, wherein the third classification is based on a combination of the result of the first classification and the result of the second classification.

14. The device of claim 13, wherein the operations further comprise:
filtering a pool of encrypted traffic flows traversing the communication network into the first plurality of encrypted traffic flows and a second plurality of encrypted traffic flows, wherein the first plurality of encrypted traffic flows comprises encrypted traffic flows for which a metric measuring one or more conditions of the communication network at least meets a predefined threshold, and wherein the second plurality of encrypted traffic flows comprises encrypted traffic flows for which the metric falls below the predefined threshold.

15. The device of claim 14, wherein the third classification additionally identifies a traffic type associated with each encrypted traffic flow of the second plurality of encrypted traffic flows.

16. The device of claim 13, wherein the first plurality of encrypted traffic flows comprises a plurality of hypertext transfer protocol secure flows.

17. The device of claim 13, wherein the first plurality of encrypted traffic flows comprises a plurality of quic flows.

18. The device of claim 13, wherein the first classification is performed using a machine learning model that is trained on third party media stores using a supervised learning approach.

19. The device of claim 13, wherein the third classification is performed using a bayesian classifier, and the bayesian classifier uses the result of the second classification as a prior.

20. A non-transitory computer-readable medium storing instructions which, when executed by a processing system of a communication network, cause the processing system to perform operations, the operations comprising:
  obtaining a first plurality of encrypted traffic flows traversing the communication network;
  performing a first classification, wherein a result of the first classification identifies a traffic type of a plurality of traffic types associated with each encrypted traffic flow of the first plurality of encrypted traffic flows, and wherein the first classification is based on a traffic pattern of the each encrypted traffic flow;
  performing a second classification, wherein a result of the second classification assigns, for each server name indication of a plurality of server name indications with which the first plurality of encrypted traffic flows is associated, one traffic type of the plurality of traffic types, and wherein the one traffic type comprises a predominant traffic type of the plurality of traffic types that is associated, based on the first classification, with a subset of the first plurality of encrypted traffic flows that share the each server name indication; and
  performing a third classification identifying a traffic type associated with each encrypted traffic flow of the first plurality of encrypted traffic flows, wherein the third classification is based on a combination of the result of the first classification and the result of the second classification.

* * * * *